(12) United States Patent
Poulakis

(10) Patent No.: US 7,445,740 B1
(45) Date of Patent: Nov. 4, 2008

(54) METHOD FOR PRODUCTION OF A FLEXIBLE SHAPED STRIP

(75) Inventor: Konstantinos Poulakis, Hildrizhausen (DE)

(73) Assignee: Gottlieb Binder GmbH & Co., Holzgerlingen (DE)

( * ) Notice: Subject to any disclaimer, the term of this patent is extended or adjusted under 35 U.S.C. 154(b) by 675 days.

(21) Appl. No.: 10/019,397

(22) PCT Filed: Oct. 10, 2000

(86) PCT No.: PCT/EP00/09932

§ 371 (c)(1),
(2), (4) Date: Dec. 28, 2001

(87) PCT Pub. No.: WO01/32465

PCT Pub. Date: May 10, 2001

(30) Foreign Application Priority Data

Oct. 30, 1999 (DE) ................ 199 52 416

(51) Int. Cl.
  *B68G 7/00* (2006.01)
  *A47C 7/00* (2006.01)
  *A47C 31/02* (2006.01)

(52) U.S. Cl. .............. 264/174.11; 264/173.16; 427/513; 427/180; 427/421.1; 29/91.4; 29/91.1; 297/452.6

(58) Field of Classification Search ........... 427/501, 427/513; 29/91.3, 91.4; 264/174.11
See application file for complete search history.

(56) References Cited

U.S. PATENT DOCUMENTS

| | | | | |
|---|---|---|---|---|
| 3,876,495 A | * | 4/1975 | Esler | 428/398 |
| 4,057,956 A | * | 11/1977 | Tolle | 57/80 |
| 4,718,718 A | * | 1/1988 | Maruyama | 297/180.12 |
| 4,874,670 A | * | 10/1989 | Boon et al. | 428/423.9 |
| 5,095,915 A | * | 3/1992 | Engelson | 600/585 |
| 5,343,610 A | * | 9/1994 | Haruda et al. | 29/525.09 |
| 6,478,382 B1 | * | 11/2002 | Schulte | 297/452.6 |

FOREIGN PATENT DOCUMENTS

| | | | |
|---|---|---|---|
| DE | 19610845 | | 9/1997 |
| DE | 19649427 | | 4/1998 |
| DE | 19743082 | | 4/1999 |
| DE | 19808995 | | 5/1999 |
| EP | 0157380 A | * | 3/1985 |
| FR | 2750690 | | 2/1998 |
| GB | 303282 | | 1/1929 |
| JP | 08280956 | | 10/1996 |
| ZA | 9805087 A | * | 3/1999 |

* cited by examiner

*Primary Examiner*—Richard Crispino
*Assistant Examiner*—Barbara J. Musser
(74) *Attorney, Agent, or Firm*—Roylance, Abrams, Berdo & Goodman, L.L.P.

(57) ABSTRACT

A method produces a flexible shaped strip (18), made of plastic, for fixing cushion cover (12) to a cushion component (10). The cushion component is formed of a foam material and includes a longitudinal channel (20) for insertion of the shaped strip (18). The shaped strip has, at least partly, a slip preventer to increase the tear resistance form the cushion component (10). The anti-slip component or slip preventer is made of a plastic softer than that used for the shaped strip (18), and is, at least partly, arranged around the outer surface of the shaped strip.

34 Claims, 1 Drawing Sheet

METHOD FOR PRODUCTION OF A FLEXIBLE SHAPED STRIP

FIELD OF THE INVENTION

Figure 1:
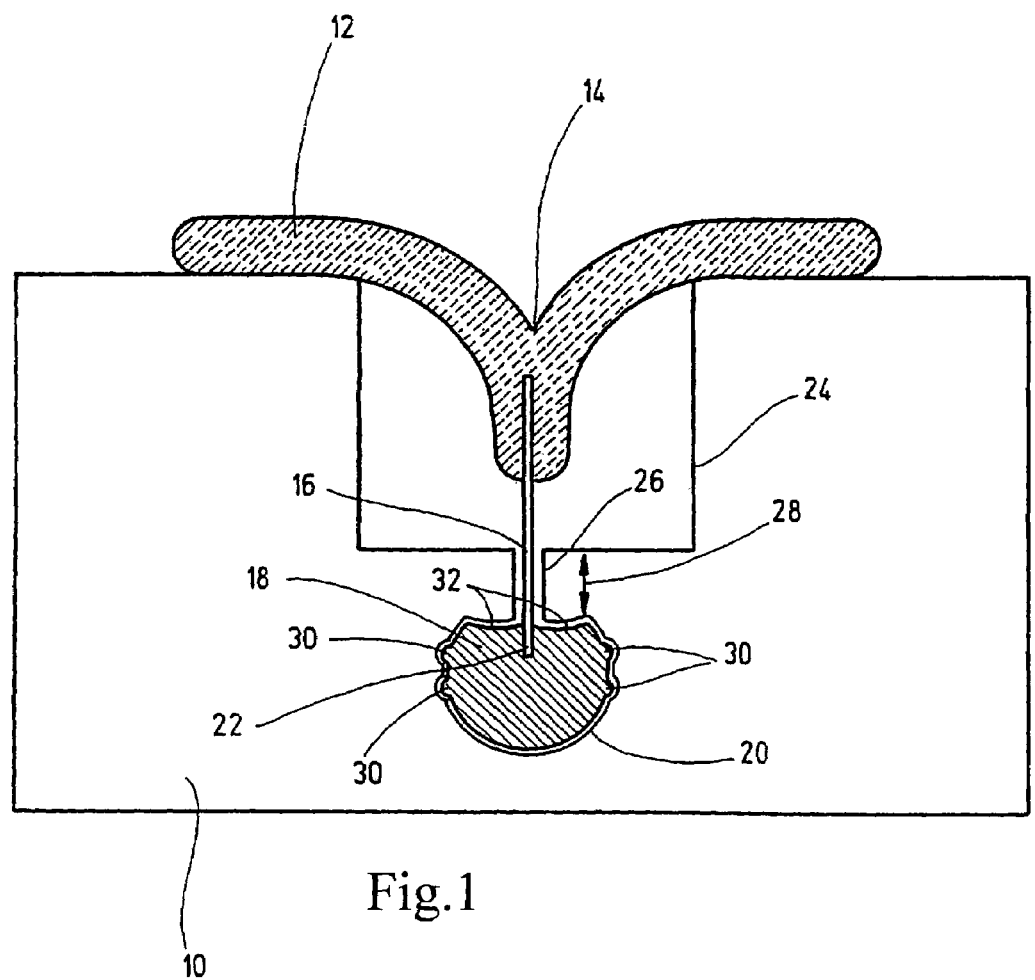

The present invention relates to a method for producing a flexible shaped strip of plastic material for fixing a cushion cover to a cushion component. The cushion component includes a foam material and a longitudinal passage for engaging the shaped strip. To heighten the tear resistance and to prohibit tearing of the strip out of the cushion component, the strip is provided, at least partially, with a slip preventer.

BACKGROUND OF THE INVENTION

With the method disclosed in DE 198 08 995 C1, a longitudinal passage adapted to the shape of the shaped strip is arranged within the cushion component. The passage has recesses in its longitudinal layout serving for the engagement of interlocking elements on the shaped strip. With this known method, the foam material is arranged such that the cushion component surrounds the shaped strip contiguously, so that beneficial interlocking of the shaped strip in the cushion component is attained. The interlocking forces of the shaped strip in the cushion component are generated essentially through the adhering forces between the surface of the shaped strip and the associated foam material. Furthermore, to increase the tear resistance of the shaped strip in the foam with this known solution it has been suggested to configure the strip of anti-slip components. This configuration leads, however, to relatively weak shaped strips, and the desired increase of tear resistance forces is not attained at all. Another possibility resides basically in a method for increasing the tear resistance in that a hard foam material is selected for the cushion component. The manufacture of hard foam can generally be attained very simply by variation of the polyhydric alcohol content and the hardener content, as well as their percentage composition in the cushion component material. Hard foam, however, leads to an undesirable reduction of the degree of seat comfort.

SUMMARY OF THE INVENTION

Objects of the present invention are to provide a method for the production of a shaped strip with increased tear resistance in comparison with the known solutions for shaped strips in cushion components, without reducing seat comfort.

Since a soft plastic material is used as slip preventer for the shaped strip, serving as the plastic forming the shaped strip, and since this slip preventer is applied at least partially on the exterior periphery of the shaped strip, a modification of the surface property is thus attained for the shaped strip. Measurements have shown that the tear resistance forces with this arrangement are notably higher than with comparable methods without anti-slip coating. Because of the slip prevention provided for the shaped strip, hard plastic materials can be used for the shaped strip, such as high density polyethylene.

Particularly high tear resistance forces can be obtained insofar as, preferably with the method according to the present invention for slip prevention, a material is used such as a plastic material with a Shore hardness below 150, preferably 30 to 60, and particularly is 60.

With one particularly preferred embodiment of the method of the present invention, the plastic material having anti-slip components is applied to the plastic shaped strip by extrusion, particularly by a coextrusion method. Here, the use of EPDM-rubber has proven to be particularly favorable.

With another preferred embodiment of the method of the present invention, the plastic material having anti-slip components is applied to the shaped strip by a hot dipping method. Weakly adhering adhesives on a base of synthetic rubber are particularly to be considered in this case for use as the coating.

In the case of another preferred embodiment of the method of the present invention, the anti-slip component is a plastic material applied by a spray-coating method onto the shaped strip. By using such method, the layers applied by spraying are very thin layers and are one after the other onto the shaped strip. As coating material, a one-component adhesive based on nitroxyl or nitrous rubber base from an organic solution is preferably used.

In the case of one more preferred embodiment of the method of the present invention, the plastic material having anti-slip components is applied by a traditional coating or doctoring method. The applied coating is hardened by ultraviolet light and/or by an electron radiation source. The viscosity of the anti-slip components material can be adjusted by addition of a reactive diluting medium.

Other objects, advantages and salient features of the present invention will become apparent from the following detailed description, which, taken in conjunction with the annexed drawings, discloses preferred embodiments of the present invention.

BRIEF DESCRIPTION

Referring to the drawings which form a part of this disclosure:

FIG. 1 is a side elevational view in section of a seat component made according to the present invention.

DETAILED DESCRIPTION OF THE INVENTION

The fixing system shown in FIG. 1 is for a vehicle passenger seat. Aircraft passenger seats can also be considered as vehicle passenger seats. The vehicle seat has at least one cushion component 10, arranged for example in the area of either the seat surface or the backrest. Cushion component 10 is formed of a foamed material, particularly of polyurethane foam. Such foam is configured to be finely porous. A cushion covering 12 covers cushion component 10 on its outside facing outward into the environment, which covering is shown only diagrammatically in the drawing. The covering, for example, is formed of a fabric or leather material. Cushion covering 12 is pulled tight and anchored to cushion component 10 with formation of an ornamental trim or anchoring seam 14, and is attached by means of a sewn-on seat fastening clip 16 of fabric, fleece, metal gauze, plastic material or the like. The cushion component is provided with a shaped strip 18 serving as anchoring means.

A longitudinal passage 20 is formed in the foam material of cushion component 10 to receive shaped strip 18. The passage 20 engages contiguously with shaped strip 18. Shaped strip 18 is held flexibly at least in its longitudinal direction, and is formed of plastic material, for example of a soft PVC of Type 740012 of Firma Decelith or of a hard High Density Polyethylene (HDPE), for example, of the Type 65428 from Firma Schulmann. Shaped strip 18 has a receiving slot 22, into which is inserted the sewn-on seat fastening clip 16 like a stem or a crosspiece. Cushion covering 12 is tightly articulated with the other end of sewn-on seat fastening clip 16 through a sewn seam or by some adhesive method. Except for that securing point, sewn-on seat fastening clip 16 is configured to be longitudinally flexible, particularly in the direction of lowering the body onto the seat.

An enlargement 24 is provided for receiving ornamental trim seam 14 with sewn-on seat fastening clip 16. The enlargement opens outward into the environment and inward into a stem- or crosspiece-like shaped cutout 26, arranged to receive the passage of sewn-on seat fastening clip 16. The cutout's other end in turn is opened into longitudinal passage 20. Since the foam material is compressible within a predeterminable range, shaped strip 18 can be inserted manually in steps, and can be removed repeatedly from the associated longitudinal passage 20 for material exchange, repair or the like.

The possible depth 28, indicated in the drawing with a double arrow, at which the construction is built in modern vehicle seats can no longer be varied optionally, since cushion components 10 are configured to be quite thin. As a result, a very thin cross section must also be selected for the shaped strip 18 to avoid during use the discomfort of sitting down on and feeling the shaped strip is hard. Since the cross sections for shaped strip 18 must be of small dimensions and can no longer be selected to be of any optional desirable dimensions, it is necessary, despite the narrowness of shaped strip 18, to anchor the strip securely in the foam material to prevent an undesirable tearing out. Undesirable tearing out would lead to destruction of cushion covering 12. To increase the tear resistance, interlocking configurations 30 can also be provided on the exterior periphery of shaped strip 18, as further slip prevention elements which engage in the foam material. Preferably, in this case, the foam material is accessible through corresponding channel-like cutouts. Individual features of such a fastening system are described in DE 198 08 995 C1.

To increase the tear resistance for such a solid shaped strip 18, which strip also can be configured profiled as a hollow chamber (not shown), coatings of anti-slip components are applied to shaped strip 18 for providing this function. The layer thickness of such an anti-slip components material is quite thin. For the simplified drawing representation, it has simply been deleted from the drawing. Particularly, plastic materials are favorable for use as anti-slip components, which materials have a Shore hardness lower than 150, preferably between 30 and 60, and particularly preferably of 60. Improved adherence of the foam material to shaped strip 18 having the coating is obtained when soft plastic material is used for the coating. Preferably, the extremely soft plastic is applied by coextrusion in the area of the undercut 32, where the soft plastic engages and from below supports the wing-like widened areas on the top of longitudinal passage 20. As another plastic type, for example EPDM rubber of Firma Macromas can be used. EPDM rubber is to be understood as the terpolymerization of ethylene and greater portions of propylene as well as a few percentage points of a third monomer rubber with diene structure, in which the diene-monomer provides the required double bonds for a subsequent sulfur vulcanization.

Another possibility for the application of anti-slip components coating is obtained by a hot melt coating method, for example using a weakly adhering adhesive on a base of synthetic rubber. This coating material is widely available, particularly under the mark 'Lunatack AS 3916' from the H. B. Fuller Company. The processing occurs through a spray-nozzle or roll application in an atmosphere of 150 to 175° C. The viscosity at 175° C. is approximately 14,000 mPas, whereby the softening point is at about 117° C. The viscosity is determined in terms of DIN 53018. The softening point is determined in terms of DIN 52011.

Another method provides a spray coating, whereby very thin layers are generated on shaped strip 18. Preferably, in this case, a one-component special adhesive material on nitrile-rubber-base from an organic solvent is used, for example Type 1475 of Firma Bostik. This special adhesive is an adhesive of the type which can also be used as a two-component adhesive. The adhesive is formed on nitrile rubber base, and preferably ketones or esters serve as solvent medium. The viscosity is 3100 mPas.

With one further coating method, a UV-hardenable composition is used, for example 85% Ebecryl 4835 as reactive oligomer, with 15% Ebecryl 111 added thereto as reactive diluting medium for adjustment of the viscosity of the anti-slip components plastic material. The composition can be obtained from Firma UCB.

With the aforementioned application method, the shaped strips can provide conventional fixing systems having remarkably higher tear resistance, so that a secure anchoring of shaped strip 18 in the foam material is guaranteed. Despite increased interlocking forces, shaped strip 18 without any further manipulation can be repeatedly detached from the foam material, which would not be possible if shaped strip 18 were securely cemented in the foam material. Dependent upon the selected combinations of materials, the resulting fixing system can also be disposed of in an environmentally compatible manner or can be recycled.

In the case of one further preferred embodiment of the method of the present invention, the anti-slip component plastic material is applied by a dipping coating method. In this case, the coating material used is preferably a one-component adhesive nitryl rubber base out of an organic solution. Optionally during the so-called flash-off time, the profile is fed through an additional dipping trough containing flakes or clots, formed primarily of polyurethane foam or of fibers. Thus, a tight connection of the flakes or clots with the profile is generated for the formation of an anti-slip layer.

While various embodiments have been chosen to illustrate the invention, it will be understood by those skilled in the art that various changes and modifications can be made therein without departing from the scope of the invention as defined in the appended claims.

What is claimed is:

1. A method for producing a flexible shaped strip for securing a cushion covering to a cushion component formed of foam material and provided with a longitudinal passage for engaging the shaped strip, comprising the steps of:
   forming the shaped strip from plastic material for engaging the longitudinal passage in the cushion component and securing the covering to the cushion component; and
   providing a slip-preventer at least partially on an exterior periphery of the shaped strip, the slip-preventer being a plastic material softer than the plastic material of the shaped strip;
   whereby, the slip-preventer increases tear resistance of the shaped strip to resist inadvertent removal of the shaped strip from the longitudinal passage in the cushion component.

2. A method according to claim 1 wherein
the soft plastic material of the slip-preventer has a Shore A hardness lower than 150.

3. A method according to claim 2 wherein
the Shore A hardness is between 30 and 60.

4. A method according to claim 2 wherein
the Shore A hardness is 60.

5. A method according to claim 1 wherein
the slip-preventer is applied to the shaped strip by extrusion.

6. A method according to claim 1 further comprising coextruding the slip-preventer onto the shaped strip.

7. A method according to claim 1 wherein
the slip-preventer is applied to the shaped strip by a hot coating method.
8. A method according to claim 1 wherein
the slip-preventer is applied to the shaped strip by a spray method.
9. A method according to claim 1 wherein
the slip-preventer is applied to the shaped strip by a dipping coating method.
10. A method according to claim 1 wherein
the slip-preventer is a coating applied on the shaped strip; and
the coating is hardened by ultraviolet light.
11. A method according to claim 1 wherein
the slip-preventer is a coating applied on the shaped strip; and
the coating is hardened by an electron-radiation source.
12. A method according to claim 1 wherein
the soft plastic material is rubber.
13. A method according to claim 1 wherein
the shaped strip is formed with recessed areas between the shaped strip and the cushion component, the slip-preventer being applied only in the recessed areas.
14. A method according to claim 1 wherein
the shaped strip has a profile selected from the group consisting of round, T-shaped, fixing wedge and fixing anchor.
15. A method according to claim 1 wherein
the slip-preventer is applied to the shaped strip in flakes.
16. A method according to claim 1 wherein
the slip-preventer is applied to the shaped strip in clots.
17. A method according to claim 1 wherein
the slip-preventer is applied to the shaped strip by coating.
18. A method according to claim 1 wherein
the shaped strip with the slip-preventer thereon is inserted into a foam cushion for securing a cover to the cushion such that the slip-preventer directly engages the foam cushion.
19. A method for producing a flexible shaped strip for securing a cushion covering to a cushion component formed of foam material and being provided with a longitudinal passage for engaging the shaped strip, comprising the steps of:
forming the shaped strip from plastic material, the strip having a top surface with a longitudinal slot, a fastener received in the slot and coupled to the shaped strip, and longitudinal interlocking members on side surfaces of the strip defining recessed areas between the interlocking members; and
providing a slip-preventer on said top surface of the strip, the slip-preventer being a plastic material softer than the plastic material of the shaped strip to reduce slippage between the strip and the foam material and to increase tear resistance of the shaped strip to resist inadvertent removal of the shaped strip from the longitudinal passage in the cushion component.
20. A method according to claim 19 further comprising
applying the soft plastic material to the recesses between the interlocking members.
21. A method according to claim 19 wherein
the soft plastic material of the slip-preventer has a Shore A hardness lower than 150.
22. A method according to claim 19 wherein
the Shore A hardness is between 30 and 60.

23. A method for producing a flexible shaped strip and securing a cushion covering to a foamed cushion material having a longitudinal passage for engaging the strip, comprising the steps of:
forming the shaped strip from a first plastic material, the strip having a top surface with a longitudinal slot, a fastener received in the slot and coupled to the shaped strip and to the cushion covering material, the shaped strip having a plurality of longitudinal interlocking members on side surfaces;
applying a second plastic material on a surface of the shaped strip to provide a slip-preventing material on the shaped strip, the second plastic material being softer than the first plastic material to decrease slippage between the shaped strip and the foamed cushion material; and
inserting the shaped strip into the longitudinal passage of the foamed cushion material such that the second plastic material directly engages the foamed cushion material.
24. A method according to claim 23, comprising
applying a coating of the second plastic material onto the shaped strip by extrusion coating, hot coating, spray coating, or dipping.
25. A method according to claim 23, comprising
applying the second plastic material to the top surface of the shaped strip.
26. A method according to claim 23, comprising
applying the second plastic material to an area between the longitudinal interlocking members.
27. A method according to claim 1, wherein
the slip-preventer is coated onto the shaped strip as a thin layer having a thickness less than a dimension of the shaped strip, and wherein the shaped strip has a size to be retained in the longitudinal passage of the cushion component.
28. A method according to claim 27, wherein
said shaped strip has a top surface with a concave recessed shape and where said antislip material is formed on the top surface.
29. A method according to claim 19, wherein
the top surface of the shaped strip has a concave recessed shape.
30. A method according to claim 29, wherein
the anti-slip preventer is applied as a coating on the top surface of the shaped strip where the coating is thin relative to the dimension of the shaped body.
31. A method according to claim 23, wherein
the top surface has a concave recessed shape; and
the longitudinal passage in the cushion material has a cut-out portion to cooperate with the recessed shaped top surface to retain the shaped strip in the longitudinal passage.
32. A method according to claim 23, wherein
the second plastic material is applied as a thin coating on the shaped strip; and
the coating is thin relative to the dimension of the shaped strip.
33. A method according to claim 31, wherein
the second plastic material is applied to the top surface.
34. A method according to claim 1, further comprising
a fastener coupled to the shaped strip and extending longitudinally along a length of the shaped strip.

* * * * *